P. MACKAY.
AUGER MAKING MACHINE.
No. 253,076. Patented Jan. 31, 1882.
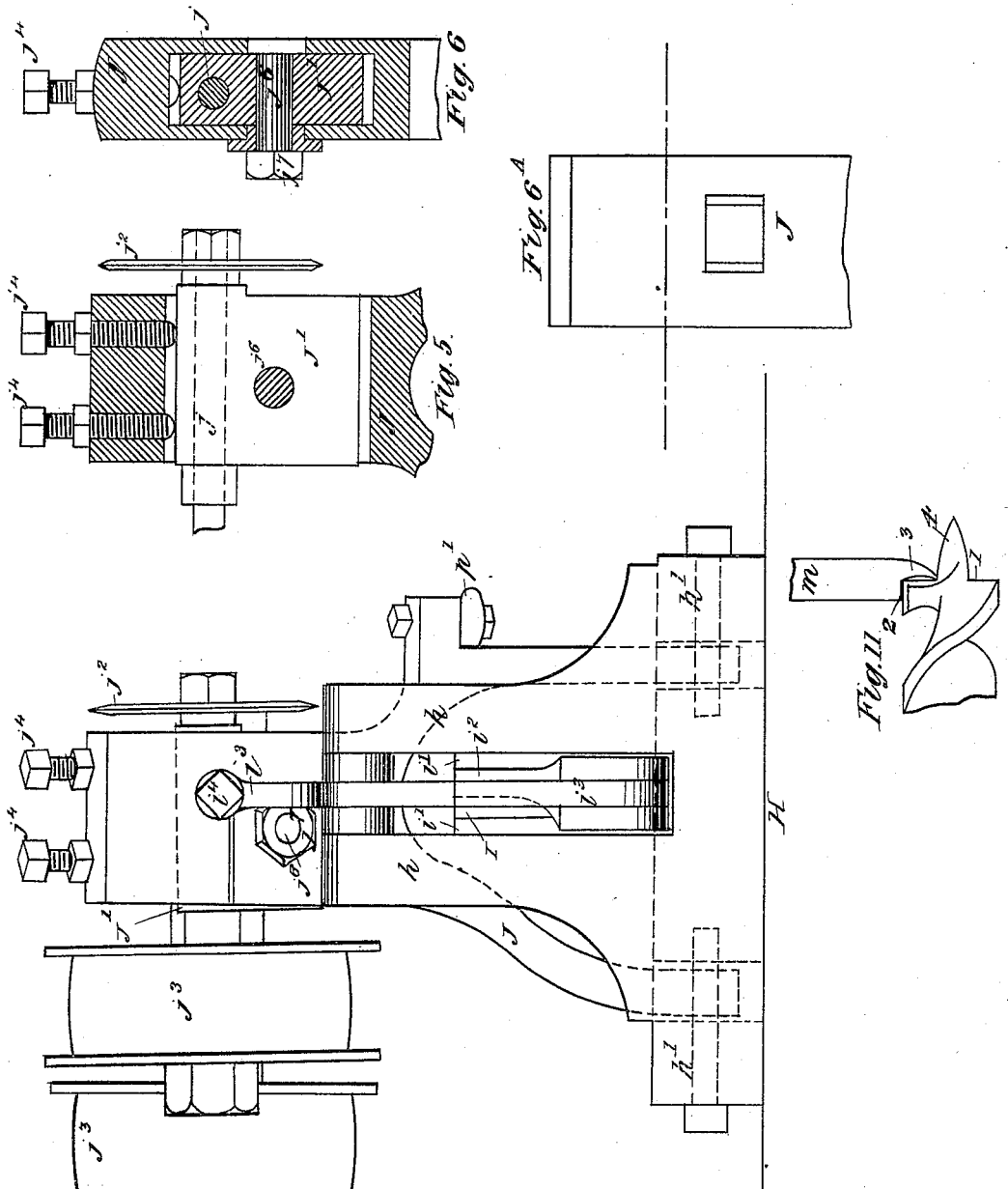

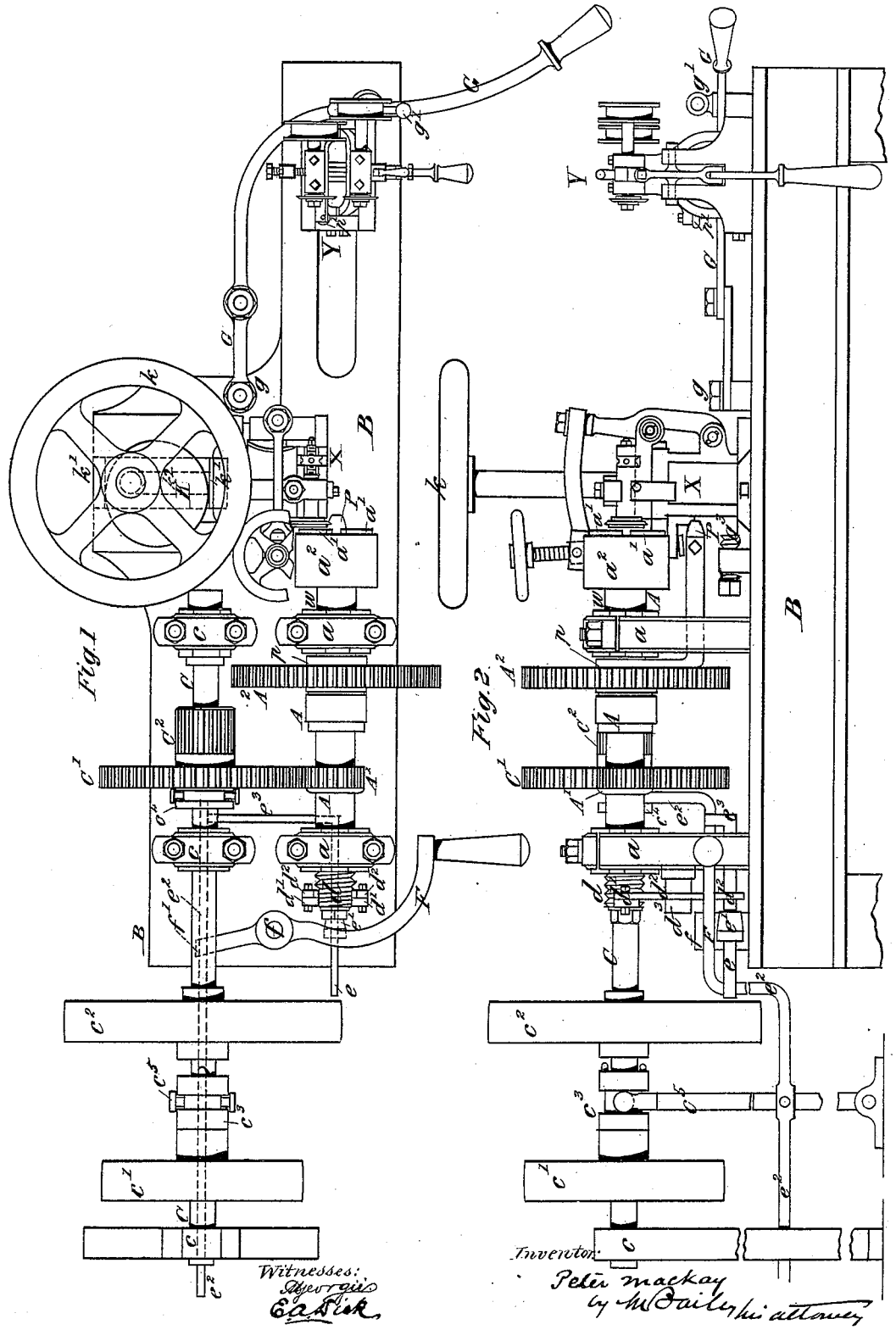

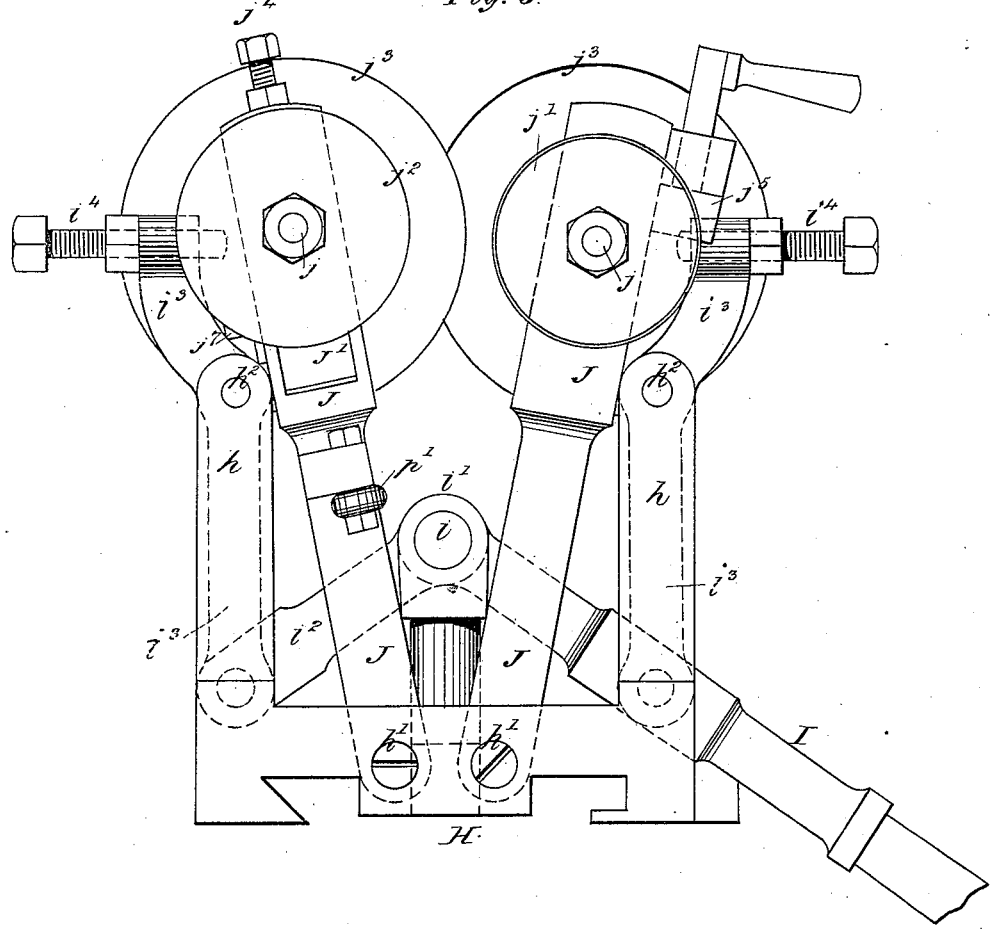

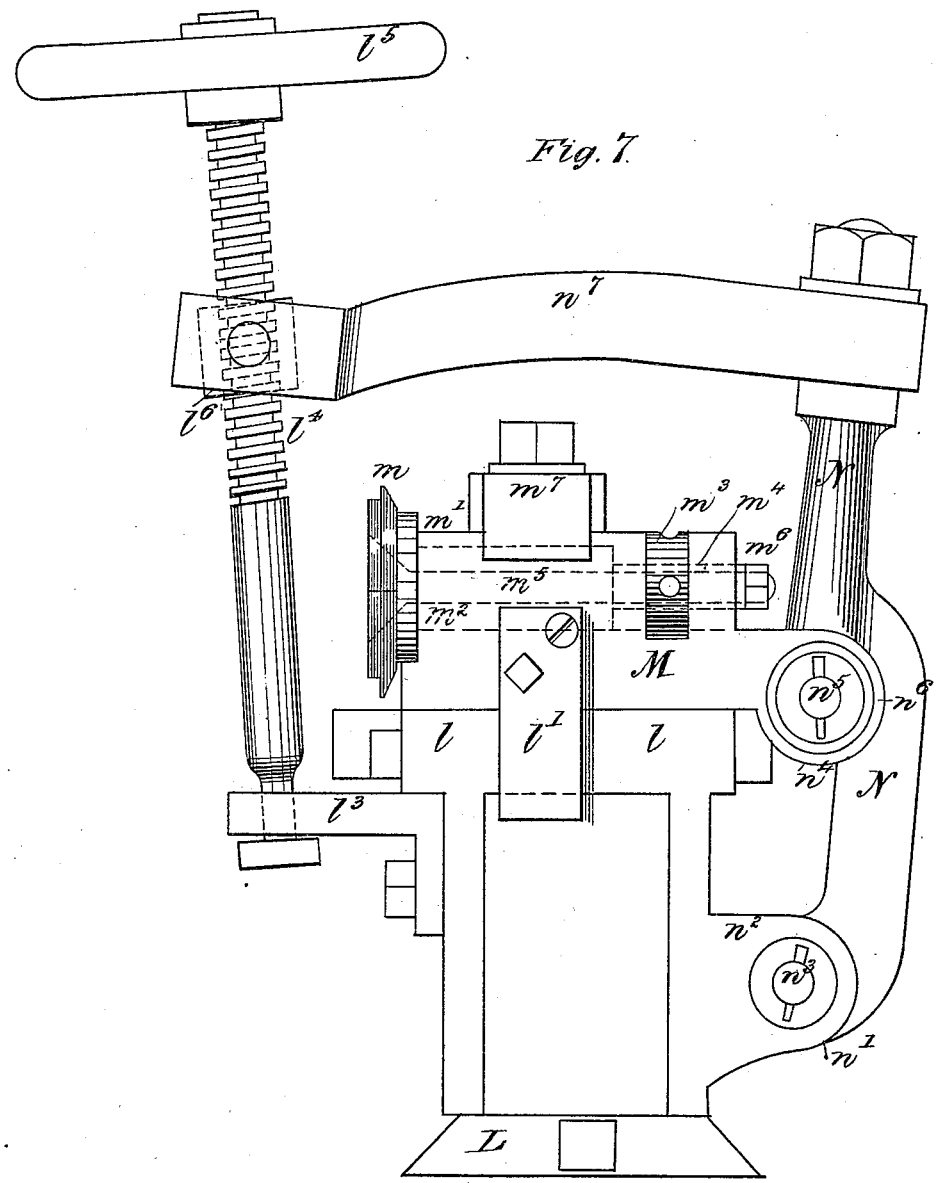

P. MACKAY.
AUGER MAKING MACHINE.
No. 253,076. Patented Jan. 31, 1882.
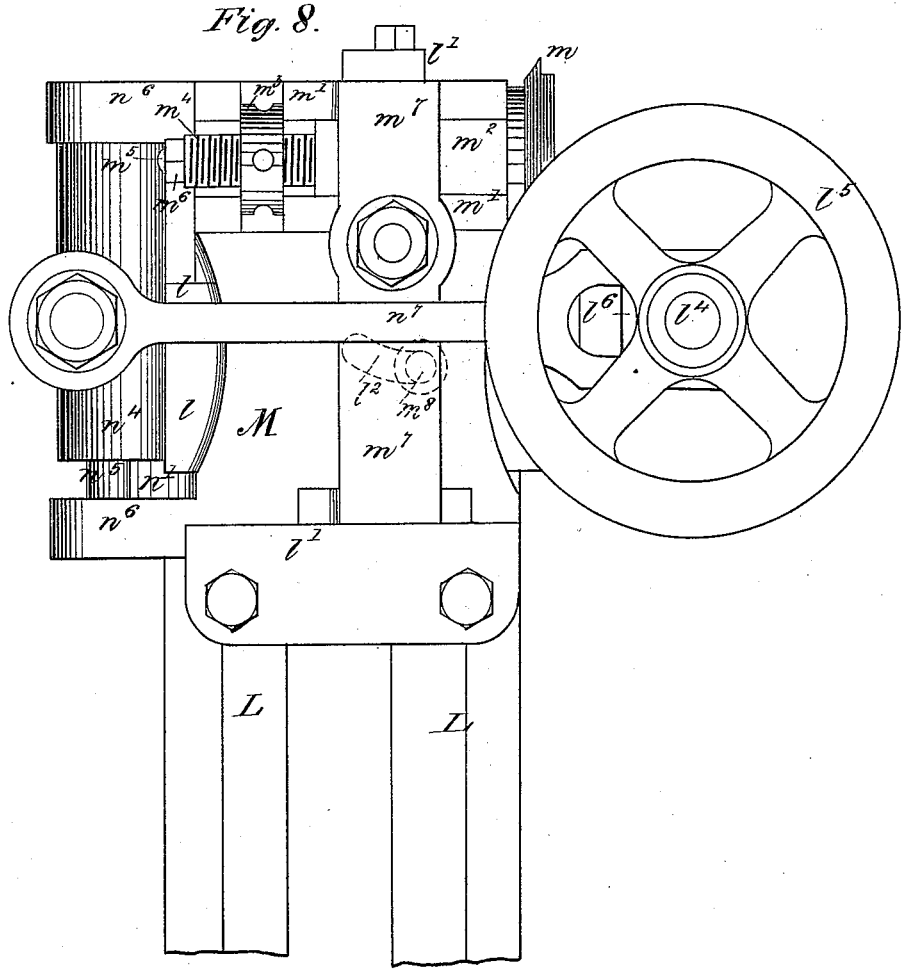
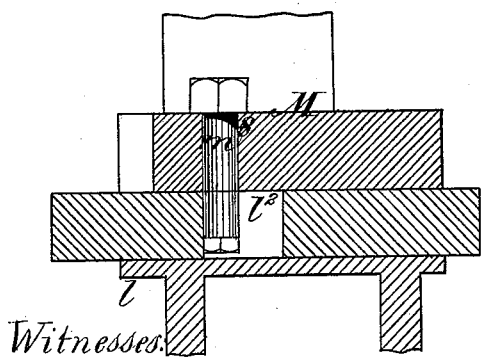
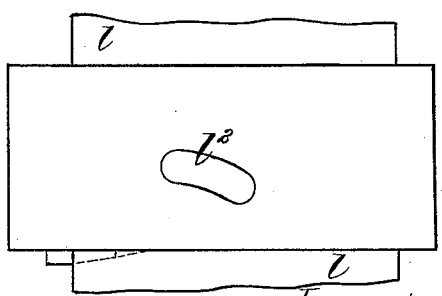

UNITED STATES PATENT OFFICE.

PETER MACKAY, OF GLASGOW, COUNTY OF LANARK, SCOTLAND, ASSIGNOR TO HIMSELF, BENNET BRUCE BURLEY, AND ROBERT HEYS, OF SAME PLACE.

AUGER-MAKING MACHINE.

SPECIFICATION forming part of Letters Patent No. 253,076, dated January 31, 1882.

Application filed November 8, 1879. Patented in England September 7, 1878.

*To all whom it may concern:*

Be it known that I, PETER MACKAY, of Glasgow, in the county of Lanark, North Britain, have invented a machine for cutting screw-threads on augers and for turning and preparing the points of augers preparatory to cutting the screw-threads thereon, of which the following is a specification.

My said invention relates principally to a machine for cutting the screw-threads on the points of augers—viz., those screw-threads by means of which the entrance of the auger into the wood or substance wherein a hole is to be bored by the auger is effected; and my said invention has for its object to dispense with the manual operation of cutting the said screw-threads; and in order to render the machine capable of squaring, turning, and otherwise preparing the end of the auger upon which the screw is to be cut preparatory to cutting the said screw thereon, I provide it with mechanism for thus preparing the bit end of the auger, which mechanism is arranged so as to be readily moved out of the way after it has done its work, so as not to interfere with the operation of the screw-cutting apparatus.

In the drawings, Figure 1 represents in plan a machine and its attachments constructed according to my invention, and Fig. 2 represents the same in side elevation.

A shaft, A, constituting a hollow mandrel, is mounted to turn in bearings $a$ upon the framing B of the machine. The upper part only of the said framing is shown in the drawings; but it will be understood that the machine is mounted at such a distance above the floor as will be convenient for operation. The shaft or mandrel A is hollow to admit the auger to be operated upon to be passed into it, so that the end to be shaped and upon which the screw is to be cut projects the requisite distance from one end of the said shaft or mandrel, the said shaft or mandrel being at this end provided with griping-jaws $a'$ $a'$ for the purpose of holding the auger concentrically and in line with the center of the mandrel—for instance, by a compressing collar or sleeve, (indicated at $a^2$, Figs. 1 and 2.)

The shaft C is the driving-shaft of the machine. It is mounted in bearings $c$ $c$, and is driven by one or other of the pulleys $c'$ $c^2$, which are of different sizes, to give or aid in giving different speeds, and are kept constantly running by bands from an overhead or other shaft. A clutch, $c^3$, between them is attached by a groove and feather to the shaft C, and the pulleys $c'$ $c^2$ run loosely upon the said shaft. According, therefore, as to which pulley the clutch $c^3$ is engaged with, the shaft C is driven at a greater or less speed. The said shaft C carries a toothed wheel, C', and a broad toothed pinion, $C^2$. The shaft A likewise carries a toothed wheel, $A^2$, and a pinion, A'. The shaft C is capable of being slid in its bearings, so that, in place of the toothed wheel C' driving the shaft or mandrel A through the pinion A', (whereby a rapid motion is given to the said mandrel,) the said wheel and pinion are thrown out of gear, and the pinion $C^2$ engages with the wheel $A^2$ and drives the mandrel at a slower rate. The wheels giving the high speed are in gear when the end of the auger is being shaped and the entering point formed, and those giving the lower speed are in gear when the screw is being cut.

On the end of the shaft or mandrel A is a screw, $d$, the pitch of the screw-thread on which corresponds to the pitch of screw-thread required to be cut upon the auger. In proximity to the said screw $d$, and on both sides thereof, are portions of screw-nuts $d'$, the screw of which corresponds to the thread of the screw $d$, the said portions of nuts $d'$ being carried by the upper arms of levers $d^2$, turning upon a fulcrum at $d^3$, the said levers being so arranged that when their arms below the fulcrum $d^3$ are forced apart the portions of screw-nuts $d'$ engage with the screw $d$ and cause the said screw, as the shaft or mandrel A is rotated, to travel in the said portions of nuts, and thereby give a backward longitudinal traverse in its bearings to the shaft or mandrel A. The screw $d$ and portions of screw-nuts $d'$ are made removable, so that various pitches of screws may be substituted as required. A spring may be placed between the levers $d^2$, tending to force them away from the screw. The lower arms of the levers are forced apart by an inclined plane, $e'$, upon a bar, $e$, sliding through the standard of one of the bearings $a$. This bar $e$ is attached by the rod $e^3$ to a bar, $e^2$, sliding in two of the standards of the bearings $c$, this bar carrying an embracing-piece engaging with the collar $c^4$ on the shaft C, and the said bar is also attached to the shifter $c^5$ of the clutch $c^3$. The lever F turns on the framing B upon a pin at $f$, and its inner end, $f'$, enters a slot in the bar $e^2$. It will be seen that by moving the handle F in one or other direction it so moves the bar $e^2$ that the shaft C is moved longitudinally for engaging the wheels A' C' or A² C², the inclined plane $e'$ is forced between the lower ends of the levers $d^2$ and presses the nuts $d'$ into engagement with the screw $d$, or the reverse, and shifts the clutch from the pulley $c'$ to that $c^2$, or the reverse.

While the high speed is given to the mandrel A—that is to say, while it is not moving longitudinally—a half-collar, which may be on a bar hinged to the opposite bearing, $c$, (not shown in the drawings,) may be turned down over the shaft A at the part marked $w$, so as to form a filling between the bearing $a$ and the back of the part $a^2$ and prevent longitudinal movement of the shaft A.

On the bed of the machine, sliding in dovetail guides therein, in line with the length of the mandrel A, is the apparatus marked Y in Figs. 1 and 2, by which apparatus the entering screw thread or threads and the end point upon the auger ends are cut. Figs. 3 and 4 represent respectively side elevations, taken at right angles to each other, of this apparatus. It is brought up to position for its tools to act upon the auger, and is withdrawn from that position by the lever G, Figs. 1 and 2, which is jointed and has its fulcrum at $g$. Passing through the said lever and the bottom plate of the apparatus Y is a set screw, $g'$, by screwing down which to bear upon the bed of the machine the apparatus can be fixed in any position to which it may be brought. An adjustable stop, $g^3$, Fig. 2, is mounted on the bed of the machine to limit the motion of the said apparatus, so that it may be brought up to its proper position for action.

Referring to the large views of the said apparatus Y, Figs. 3 and 4, the foundation-plate H has two double standards, $h$ $h$, for carrying the mechanism of the apparatus, which consists of two arms or levers, J, whose lower parts are bifurcated and enter slots in the foundation-plate H, where they turn upon pins $h'$, so that they can be brought into position for action or out of that position by means of the lever I, having its fulcrum upon a pin, $i$, passing through lugs $i'$ on the upper part of a guide-piece, whose lower part is capable of rising and falling in a slot in the foundation-plate H, to which pin is also attached an arm, $i^2$.

Turning on pins $h^2$ $h^2$ passing through the standards $h$ are levers $i^3$, their lower ends being attached, that of the one to the lever I and the other to the arm $i^2$. The upper ends of these levers carry bearing-screws $i^4$, to bear upon the upper ends of the levers J to force them inward when the lever I is raised, this raising forcing the lower ends of the levers $i^3$ outward, and therefore the upper ends inward.

In bearings in the upper ends of the levers J are the shafts $j$ of cutting-disks $j'$ and $j^2$, and also upon the said shafts $j$ are pulleys $j^3$ for driving the said disks, which may be effected by bands from the overhead shaft which drives the shaft C of the machine. The disk $j'$ is for cutting the point upon the tip of the auger, and has a form on its cutting-edge which corresponds with the shape of point required. The other disk, $j^2$, is for cutting the screw-threads on the end, and has a form at its edge which will cut the required shape of space between the screw-threads. As the disk $j^2$ is required to be set at an angle corresponding to the pitch of the screw to be cut, its bearing is made adjustable, it consisting of a block, J', through which the shaft of that disk passes, the said block being in a slot in its lever J sufficiently large to allow of its rise and depression at either end by turning on the pin $j^6$. The screws $j^4$ $j^4$ bear upon the top of this block, and by them it is adjusted to the required angle and retained in that position. Fig. 5 is a longitudinal section, and Fig. 6 a transverse section, of this part of the said lever, showing this bearing clearly. The end of the bolt $j^6$ is square, and the washer at the other side has a similar square. They take into recesses in the lever J large enough to allow of motion of the center $j^6$. Fig. 6ᴬ shows the bolt-head in its recess. The parts are fixed in position when set by the nut $j^7$.

As the disk $j'$ for cutting the point is required to be brought into action by the raising of the lever I, while the other disk, $j^2$, is not brought into its acting position, the lever J of the said disk $j'$ is provided with a filling-piece, $j^5$, which, being brought down between the screw $i^4$ and the lever J, causes the bringing up of this disk $j'$ to position for work without bringing up the other disk, $j^2$. The said levers are also arranged by the screws $i^4$ being adjusted or otherwise, so that when the filling-piece $j^5$ is withdrawn the raising of the lever I will bring up the disk $j^2$ for cutting the screw without bringing up the disk $j'$. A spring may be placed between the levers J J, tending to urge them apart.

With the machine is also shown combined an apparatus, (marked X in Figs. 1 and 2,) this apparatus being for turning, squaring, or cutting the shoulder and otherwise preparing the end of the auger preparatory to cutting the screw thereon, the said apparatus being capable of sliding in the bed of the machine in grooves at right angles to the length of the mandrel to bring it up to its work. This is effected by means of the cam K, operated by means of a hand-wheel, $k$. The axis of this cam passes through a slot in the foundation-plate of the apparatus X, and the cam lies between, so as to act upon two projections on the said foundation-plate. This slot and these projections are marked respectively $k^2$ and $k'$ in Fig. 1.

Figs. 7 and 8 represent respectively a front elevation and a plan of this apparatus X. It consists of a foundation-plate, L, upon a table or sole-plate, $l$, on which is capable of sliding the upper part, M, carrying the cutting-tool $m$, for preparing the end of the auger preparatory to cutting the screw thereon. The top part M is attached to the sole-plate $l$ by guides $l'$, so as to be capable of sliding. It carries between guides $m'$ the tool-carrier $m^2$, which may be adjusted by rotating the confined nut $m^3$ upon the screw $m^4$ on the said carrier. The tool $m$ is attached to the carrier, which attachment may be effected by a bolt, $m^5$, passing through the carrier and secured by a nut, $m^6$. The carrier is secured in place by the bar $m^7$. In the sole-plate $l$ is a curved slot, $l^2$, (shown in the plan of a part of the said sole-plate in Fig. 9, and in section of the same and a part of the upper part, M, in Fig. 10.)

Projecting from the under side of the sliding part M is a pin, $m^8$, provided with an anti-friction roller, which runs in the curved slot $l^2$ as the part M is moved upon the sole-plate $l$, whereby the said part M (and consequently the tool $m$ carried thereby) is moved in a curved course corresponding to the curve of the slot $l^2$, the guides $l'$ allowing of this movement. This slot $l^2$ is in a plate which is fixed in the sole-plate flush therewith, so that it may be removed and replaced by a plate with other required form of curved slot, $l^2$, in it. The movement of the upper part, M, is effected by means of a lever, N, which is provided with a barrel-piece at $n'$, by which it is attached to the table $l$ or lower part, between lugs $n^2$ thereon, by a pin, $n^3$, passed therethrough and through the said barrel part, which said pin $n^3$ constitutes the fulcrum of the said lever N. By a similar barrel part at $n^4$ the said lever is connected to the upper part, M, by a pin, $n^5$, passing through lugs $n^6$ and through the said barrel part. The motion of the lever is allowed by passing the pin $n^5$ through a bush capable of an up-and-down movement in the barrel part $n^4$, the said barrel part $n^4$ not being so long as the space between the lugs $n^6$ $n^6$, so as to allow of the motion of the upper part, M, in its curved course.

Attached to the bracket $l^3$, so as to have play therein, is a screw, $l^4$, capable of being turned by the hand-wheel $l^5$, and running upon this screw is a nut, $l^6$, to which is attached by a pin-joint the forked end of a bar, $n^7$, whose other end is connected to the upper end of the lever N. Thus by rotating the screw $l^4$ the nut $l^6$ (and consequently the forked end of the bar $n^7$) is raised or lowered thereon, and the lever N is moved in one or the other direction, it turning upon its fulcrum at $n^3$, and consequently moving the upper part, M, in the one or the other direction and in a curved course, depending upon the curve of the slot in the sole-plate $l$.

The action of the machine is as follows: An auger upon the end of which the entering screw is to be cut being placed in the mandrel A, the parts being in the position Figs. 1 and 2, a rotatory motion of high speed is given to the mandrel A and the auger carried thereby. The hand-wheel $k$ being operated, the cam K brings the apparatus X forward to position for work, it coming into contact with such a point in the outer circumference of the auger that the tool $m$ cuts inward in a line at right angles to the length of the auger, so as to cut the shoulder—that is, the part marked 1 in Fig. 11.

The tool $m$ is preferably formed, as shown in Fig. 11, with a cutting part, 2, at such a distance back from the cutting part 3 that the said part 2 makes a cut at the end of the outer circumference of the body of the auger truly concentric with the point of the auger. The distance back of the part 2 from the part 3 will be in accordance with the size of auger required. The said part 2 thus determines the true size of the auger required. As soon as the said shoulder has been cut to the requisite depth the top part, M, of the apparatus X is moved along in the curved groove $l^2$ in the sole-plate $l$, and thereby the tool $m$ is guided in such a course that it cuts and trims the end of the auger—that is, the part marked 4 in Fig. 11—into the proper shape or curve for the reception of the screw-thread.

The apparatus is provided with an adjustable stop, against which a projection on the bed-plate is brought in contact, preventing the tool $m$ from cutting inward more deeply than is required. When the apparatus X has performed the before-mentioned operations it is moved back by the cam K and (by means of the lever G) the apparatus Y is brought into position for work. It is brought to rest in position, and fixed by the set-screw $g'$, so that the disks $j'$ $j^2$ are at the sides of the auger end, the disk $j'$ opposite the extreme end or point of the auger, and the other disk, $j^2$, being opposite the root of the end part, where it joins the shoulder, the said disks being set or adjusted, the one, $j'$, such a distance back from the other, $j^2$, as to have these relative positions. The said disks are both rapidly rotated by the bands passing over their pulleys $j^3$. The filling-piece $j^5$ being depressed and the lever I raised, the disk $j'$ is brought to bear upon the side of the extreme end of the auger and form the entering point. The lever I is then depressed and the filling-piece $j^5$ raised. The half-collar which fills the space $w$, Figs. 1 and 2, is then raised and the lever F moved so as to give longitudinal motion to the shaft C and engage the pinion $C^2$ with the wheel $A^2$ for giving the mandrel a low speed, and so, also, as to force the incline $e'$ between the levers $d^2$ and cause the portions of screw-nuts to engage with the screw $d$, and so, also, as to shift the clutch $c^3$ from the pulley $c'$ to that $c^2$, these parts being so relatively arranged as to give simultaneously the various motions. The lever I of the apparatus Y is raised and the screw-cutting disk $j^2$ brought into contact with the shaped end of the auger at the root thereof. By the combined rotatory and longitudinal motions of the mandrel A a screw is cut thereon. When a thread is to be a double thread the second thread is now to be cut. For this purpose, by bringing the clutch $c^3$ out of gear with both pulleys $c'$ $c^2$ the machine is stopped and the mandrel slid longitudinally back to its former position, and a half-turn being given to it, which may be truly made by means of indications marked upon the mandrel and one of its attachments, and the second thread of the double thread is then cut in the same manner as the first. The screw-cutting disk is guided in a curved course corresponding with the curve of the auger end by a removable and interchangeable shaper, P, connected to the collar $p$ upon the mandrel A and guided in one of the bearings $a$, this shaper bearing on an anti-friction wheel, $p'$, on that one of the levers J which carries the disk $j^2$, whereby it is guided in the required curve.

In place of using the disk $j'$ to cut the point, the disk for this purpose may be similar to the disk $j^2$, and it may be mounted and set at a corresponding angle in an adjustable bearing and in the necessary relative position therewith, so that the two threads of double screws may be cut by the two disks at one operation. In this case, of course, each lever J will bear upon the shaper P.

I do not limit myself to the arrangements of cams and levers which I have shown for bringing up the tools X and Y to their work, as other equivalent and convenient arrangement for this purpose may be adopted.

By this invention all the operations are performed successively in the same machine without removing the auger between the operations.

I claim—

1. The machine for turning and preparing the points or ends of augers and for cutting the entering screw thread or threads thereon, consisting of the driving-shaft C and differential driving-gear $c'$ $c^2$ $C'$ $C^2$ $A'$ $A^2$ and parts in connection therewith, the mandrel A, with screw $d$ and parts in connection therewith, and shaper P, also these parts in combination with the tools or apparatus X and Y.

2. The apparatus marked X in Figs. 1 and 2 and further illustrated in Figs. 7, 8, 9, and 10, for turning and preparing the ends of augers preparatory to cutting the entering screw thereon.

3. The lever N, arm $n^7$, screw $l^4$, and parts in connection therewith for effecting the movements of the upper part, M, of the apparatus X.

4. The apparatus marked Y in Figs. 1 and 2 and further illustrated in Figs. 3 to $6^A$, for cutting the entering screw thread or threads and the entering point on the ends of augers.

5. The block $J'$ and connections for adjusting the angle of the screw-cutting disks.

In testimony whereof I have signed my name to this specification in the presence of two subscribing witnesses.

PETER MACKAY. [L. S.]

Witnesses:
BENJAMIN WILLCOX,
ROBERT ADAM GUNN,
*Both of* 115 *St. Vincent Street, Glasgow.*